United States Patent
Broadbent (10) Patent No.: US 6,974,112 B2
(45) Date of Patent: Dec. 13, 2005

(54) DEPLOYMENT SYSTEM FOR A MOVEABLE WING SURFACE

(76) Inventor: Michael Craig Broadbent, 24 Turnpike Road, Husborne Crawley, Bedford MK45 0XB (GB)

(*) Notice: Subject to any disclaimer, the term of this patent is extended or adjusted under 35 U.S.C. 154(b) by 0 days.

(21) Appl. No.: 10/869,608

(22) Filed: Jun. 16, 2004

(65) Prior Publication Data
US 2005/0178925 A1 Aug. 18, 2005

(30) Foreign Application Priority Data
Jun. 17, 2003 (GB) .................................. 0314000
Oct. 8, 2003 (GB) .................................. 0323634

(51) Int. Cl.$^7$ .............................................. B64C 3/50
(52) U.S. Cl. .................... 244/213; 244/214; 244/218
(58) Field of Search ................................ 244/213–219

(56) References Cited

U.S. PATENT DOCUMENTS

| | | | | |
|---|---|---|---|---|
| 1,353,666 A | * | 9/1920 | Page ........................... | 244/210 |
| 2,246,116 A | * | 6/1941 | Wagner et al. .............. | 244/216 |
| 2,779,555 A | * | 1/1957 | Danielson ................... | 244/216 |
| 2,973,925 A | * | 3/1961 | Wiele .......................... | 244/203 |
| 3,847,369 A | * | 11/1974 | Phillips et al. .............. | 244/210 |
| 4,202,519 A | * | 5/1980 | Fletcher ...................... | 244/214 |
| 4,399,970 A | | 8/1983 | Evans | |
| 4,405,105 A | * | 9/1983 | Dilmaghani et al. ........ | 244/213 |
| 6,015,117 A | * | 1/2000 | Broadbent .................. | 244/214 |

FOREIGN PATENT DOCUMENTS

| | | |
|---|---|---|
| GB | 2 362 363 B | 9/2003 |
| WO | WO 96/09955 | 4/1996 |

* cited by examiner

Primary Examiner—Galen Barefoot
(74) Attorney, Agent, or Firm—Fay, Sharpe, Fagan, Minnich & McKee, LLP (57) ABSTRACT

A deployment system for deploying a moveable wing surface (22) from a main wing section (8). The deployment system includes a plurality of swing arm assemblies (24,26) connecting the moveable wing surface (22) to the main wing section (8) and a drive means for deploying and retracting the moveable wing surface (22), wherein at least one of the swing arm assemblies (24,26) includes a swing arm (28) pivotably connected to the main wing (8) and a connector mechanism (34) for connecting the movable wing surface (22) to the swing arm (28). The connector mechanism (34) includes a first joint (36) having at least first and second rotational degrees of freedom and a second joint (40) having at least first and second rotational degrees of freedom and at least first and second translational degrees of freedom, said connector mechanism (34) being arranged to provide, in use, rotation of the moveable wing surface (22) about its longitudinal axis during deployment of the moveable wing surface (22), and allowing relative movement between the moveable wing surface (22) and the main wing section (8) due to thermal expansion and contraction of the movable wing surface (22).

20 Claims, 6 Drawing Sheets

DEPLOYMENT SYSTEM FOR A MOVEABLE WING SURFACE

BACKGROUND

The present invention relates to a deployment system for deploying a moveable wing surface, such as a slat or flap, from a main wing section.

Various mechanisms have been proposed for deploying slats and flaps on aircraft wings, including paired track systems, Kruger flap systems and swing arm systems. The present invention relates to a swing arm system, for example of the general type described in International patent application No: PCT/NZ95/00096.

It has been shown to be beneficial in deployment systems to have an arrangement that achieves a configuration during takeoff wherein the slat is deployed and rotated relative to the main wing to a first extent such that there is no gap between the deployed slat and the leading edge of the main wing, and a configuration during landing wherein the slat is deployed and rotated to a second, greater, extent such that a slot is formed between the trailing edge of the slat and the leading edge of the wing (for example, see U.S. Pat. No. 4,399,970). Most wings taper from root to tip, and variable camber devices should mimic this taper to give full benefits along the length of the wing.

In prior art swing arm slat deployment systems such as that described in PCT/NZ95/00096, normally only one of the swing arms is driven, the undriven swing arm simply following the movement of the driven arm owing to its connection to that arm through the slat. This avoids mechanical stresses in the slats and the swing arms which might otherwise occur, for example when the slat and the wing experience different degrees of thermal expansion during flight. However, the arrangement suffers from the disadvantage that the undriven arm is not closely controlled, which can result in a step being left between the slat and the main wing section when the slat is in a stowed position.

However, if both swing arms are driven, the mechanism becomes susceptible to mechanical stress and could also under certain circumstances become jammed with one swing arm slightly in front of the line that passes through the pivot joints and the other swing arm slightly behind that line. This risk may be heightened when, for example, the slat and the wing experience different amounts of thermal expansion, or when the mechanical components in the slat mechanism are worn or do not meet required manufacturing tolerances. Locking of the swing arms could prevent the slat from deploying fully or cause it to become stuck in a partially-deployed position with potentially dangerous results.

A slat deployment system is described in GB 2362363 that addresses some of these issues. That system includes a slat that is connected to a main wing by first and second arm assemblies. Each arm assembly includes a swing arm that is pivotally attached to the main wing and upper and lower connector assemblies connecting the slat to the swing arm. The first and second arm assemblies are very similar: however, they differ in that the upper joint of the second arm assembly includes a lost motion mechanism. The slat is deployed from the main wing section by a drive system that drives both the first and second arm assemblies. The lost motion mechanism included in the second arm assembly reduces the potential for jamming by compensating for thermal expansion and contraction of the slat without transmitting stresses to the main wing.

The deployment system described in GB 2362363 provides a way of meeting the desired slat configurations for take off and landing described above and overcoming the problems associated with systems where only one of the arm assemblies is driven. In particular, it is the arrangement of the swing arms that defines the extent of deployment of the slat and the interaction of the upper and lower connector assemblies that causes the slat to rotate and hence change its angle of attack. However, that system is considered to be overly complex and lack mechanical robustness.

In mechanical systems used on aircraft simplicity is paramount. For example, with deployment systems having multiple arms with many bearings, rigging of the system is difficult, initial costs are high, maintenance is expensive, and the possibility of system failure increases. With all deployment systems it is necessary to make sure that any linkage mechanism does not get into a kinematic arrangement where it becomes locked. Deployment systems also need to be rigid in all conditions to prevent flutter and rapid wear of joints, and they need to handle loads efficiently and relay them to the main wing structure.

BRIEF DESCRIPTION

Accordingly it is an object of the present invention to provide an alternative deployment system to those currently known that mitigates at least some of the above-mentioned problems. According to a first aspect of the invention there is provided a deployment system for deploying a moveable wing surface from a main wing section, the deployment system including a plurality of swing arm assemblies connecting the moveable wing surface to the main wing section and a drive means for deploying and retracting the moveable wing surface, wherein at least one of the swing arm assemblies includes a swing arm pivotably connected to the main wing and a connector mechanism for connecting the movable wing surface to the swing arm, the connector mechanism including a first joint having at least first and second rotational degrees of freedom and a second joint having at least first and second rotational degrees of freedom and at least first and second translational degrees of freedom, said connector mechanism being arranged to provide, in use, rotation of the moveable wing surface about its longitudinal axis during deployment of the moveable wing surface, and allowing relative movement between the moveable wing surface and the main wing due to thermal expansion and contraction of the movable wing surface.

Rotation of the moveable wing surface about its longitudinal axis is controlled by the interaction of the first and second joints as the moveable wing is deployed and retracted. Relative movement between the moveable wing surface and the swing arm due to thermal expansion of the movable wing surface is facilitated by the second translational degree of freedom. The invention provides a more simplified and mechanically more robust configuration than other prior art systems, such as the system described in GB 2362363.

Preferably the second joint is arranged such that the first translational degree of freedom is in a direction that is substantially perpendicular to a longitudinal axis of the swing arm and is in the plane of the swing arm.

Advantageously the second joint is arranged to perform sliding movement relative to the swing arm in the direction of the first translational degree of freedom to move the moveable wing surface relative to the main wing.

Advantageously the second joint is arranged such that the second translational degree of freedom is in a direction that is substantially parallel to the longitudinal axis of the moveable wing surface. Preferably the second joint is arranged to perform free sliding movement in the direction of the second translational degree of freedom that allows, in use, lost motion between the movable wing surface and the main wing.

A deployment system according to any one of the preceding claims wherein the second joint is arranged such that the first rotational degree of freedom is about an axis that is substantially perpendicular to the longitudinal axis of the swing arm and is in the plane of the swing arm.

Advantageously the second joint is arranged such that the second rotational degree of freedom is about an axis that is substantially parallel to the longitudinal axis of the moveable wing surface.

Advantageously the first joint is arranged such that the first rotational degree of freedom is about an axis in a direction substantially perpendicular to the longitudinal axis of the swing arm and is in the plane of the swing arm, and the second rotational degree of freedom is about an axis substantially parallel to the longitudinal axis of the moveable wing surface.

Advantageously the second joint is a sliding spherical joint.

Preferably the deployment system includes a second swing arm assembly pivotably connected to the main wing and a connector mechanism for connecting the movable wing surface to the swing arm, the connector mechanism including a first joint having at least first and second rotational degrees of freedom and at least a first translational degree of freedom and a second joint having at least first and second rotational degrees of freedom and at least first and second translational degrees of freedom. Preferably the first joint is arranged such that the first translational degree of freedom is in a direction that is substantially parallel to the longitudinal axis of the moveable wing surface. The first joint is arranged to perform free sliding movement in the direction of the first translational degree of freedom that allows, in use, lost motion between the movable wing surface and the main wing section.

The moveable wing surface and the main wing are arranged such that a part of the moveable wing surface remains substantially in contact with a part of the main wing section when the moveable wing surface is positioned between a fully retracted position and a partially deployed position and a slot is created between the main wing and the moveable wing surface when the moveable wing surface is positioned between the partially deployed position and a fully deployed position.

The moveable wing surface, arm assemblies and the main wing section are arranged such that the size and shape of the slot is controlled. Preferably the moveable wing surface, arm assemblies and the main wing are arranged such that the slot is tapered. Typically the width of the slot is wider towards the root of the wing, with the slot tapering to a narrower width towards the tip of the wing. Preferably the distance between the moveable wing surface and the main wing is proportional to the chord of the wing. During normal flight conditions the moveable wing surface is retracted and forms the leading edge of the main wing. The deployment system allows the moveable wing surface to be deployed away from the main wing and to change its angle of attack such that the moveable wing surface can adopt an extended and rotated condition to alter the camber of the wing. This changes the lift/drag characteristics of the wing to make it more suitable for performing particular manoeuvres. For example the moveable wing surface can be deployed from the main wing and alter its angle of attack without creating a gap between moveable wing and the main wing. This first condition is typically used during takeoff. The moveable wing surface can also be deployed in an extended and rotated condition with a gap between moveable wing and the main wing. This second condition is typically used during landing. The first and second conditions are achieved by the arm assemblies controllably deploying and rotating the moveable wing surface.

A main wing typically includes a plurality of moveable wing surfaces distributed along the leading edge of the main wing, for example a wing may include between two and six moveable wing surfaces, but preferably includes three. Typically the swing arms rotate through an angle of between 80 and 120 degrees to deploy the moveable wing surface from a retracted position to a fully deployed position.

Advantageously the deployment system includes a plurality of moveable wing surfaces distributed along the main wing section, wherein each movable wing section is connected to a plurality of swing arm assemblies and the drive means includes a mechanism linking at least one swing arm assembly associated with each moveable wing surface such that, in use, the drive means deploys the moveable wing surfaces substantially simultaneously. Preferably the drive means includes a hydraulic drive system that actuates the arm assemblies substantially synchronously.

The deployment system for deploying a moveable wing surface from a main wing section may be arranged to include a plurality of swing arm assemblies connecting the moveable wing surface to the main wing section and a drive means for deploying and retracting the moveable wing surface, wherein at least one of the swing arm assemblies includes a swing arm pivotably connected to the main wing and a connector mechanism for connecting the movable wing surface to the swing arm, the connector mechanism including a first joint comprising a universal joint and a first mounting that attaches the first joint to the moveable wing surface, a second joint having a first shaft arranged substantially parallel to the moveable wing surface, second and third shafts that are axially aligned and mounted in bores in the swing arm and that are arranged to pivot and slide within their respective bores said second and third shafts are arranged substantially perpendicular to the longitudinal axis of the swing arm, a support member attaching the first shaft to the second and third shafts, and a second mounting that attaches the movable wing surface to the first shaft, wherein the second mounting, the support member and the first shaft are arranged for relative rotational and translational movement between the second mounting and the first shaft, the translational movement allowing lost motion between the moveable wing section and the main wing due to thermal expansion and contraction of the movable wing surface, and the interaction between the first and second joints causes, in use, rotation of the moveable wing surface about its longitudinal axis during deployment of the moveable wing surface.

In one embodiment the support member is fixedly attached to the first, second and third shafts and the second mounting is arranged for pivoting movement about and sliding movement along the first shaft. In another embodiment the support member is fixedly attached to the second and third shafts and the first shaft is arranged for pivoting movement and for sliding movement relative to the support member.

The deployment system for deploying a moveable wing surface from a main wing section, may alternatively be arranged to include a plurality of swing arm assemblies connecting the moveable wing surface to the main wing section and a drive means for deploying and retracting the moveable wing surface, wherein at least one of the swing arm assemblies includes a swing arm pivotably connected to the main wing and a connector mechanism for connecting the movable wing surface to the swing arm, the connector mechanism including a first joint comprising a universal joint and a second joint comprising a sliding spherical joint, wherein the second joint allows lost motion between the moveable wing section and the main wing due to thermal expansion and contraction of the movable wing surface, and the interaction between the first and second joints causes, in use, rotation of the moveable wing surface about its longitudinal axis during deployment of the moveable wing surface.

According to a second aspect of the invention there is provided an aircraft including a deployment system substantially as described above.

DESCRIPTION OF THE DRAWINGS

An embodiment of the present invention will now be described, by way of example only, with reference to the accompanying drawings in which like references indicate equivalent features, wherein.

Figure 1:
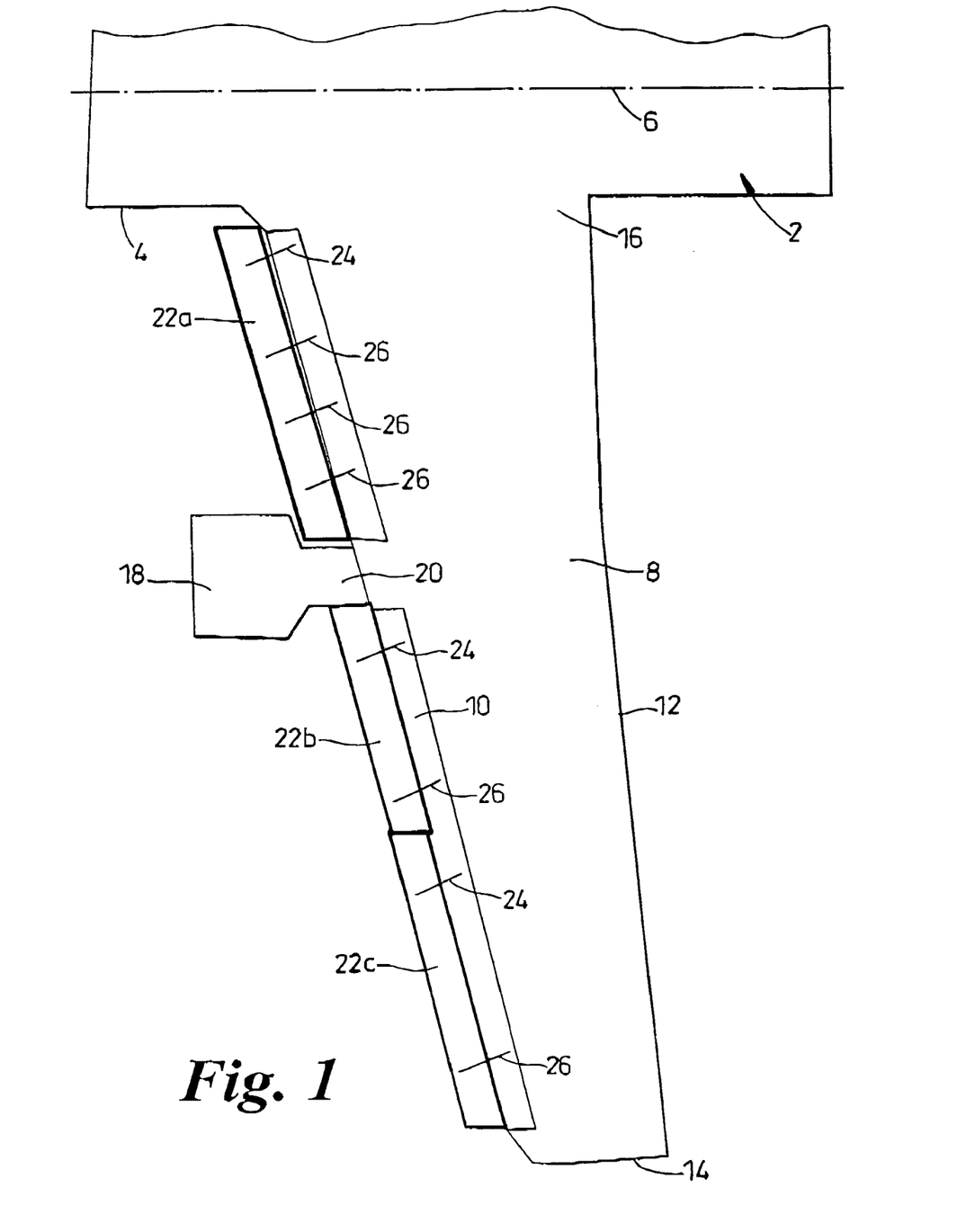
FIG. 1 is a diagrammatic plan view of a wing with three slats at the leading edge separated by an engine pylon.

FIG. 1 shows part of an aircraft 2 having a fuselage 4 with a centre line 6. In the drawing, only the port wing is shown: this includes a main wing section 8 having a leading edge 10, a trailing edge 12, a wing tip 14 and a root 16. The wing is tapered, the chord decreasing from the root 16 to the tip 14. An engine 18 is attached to the underside of the main wing section 8 by means of a pylon 20.

DETAILED DESCRIPTION

A plurality of slats 22 is attached to the leading edge of the wing. In the example shown in the drawing, there are three slats, an inner slat 22a, a middle slat 22b and an outer slat 22c. Each slat 22 is attached to the leading edge 10 of the wing by means of first and second swing arm assemblies 24,26. Each slat has at least two swing arm assemblies, for example the inner slat 22a has one first swing arm assembly 24 and three second swing arm assemblies 26.

Figure 2:
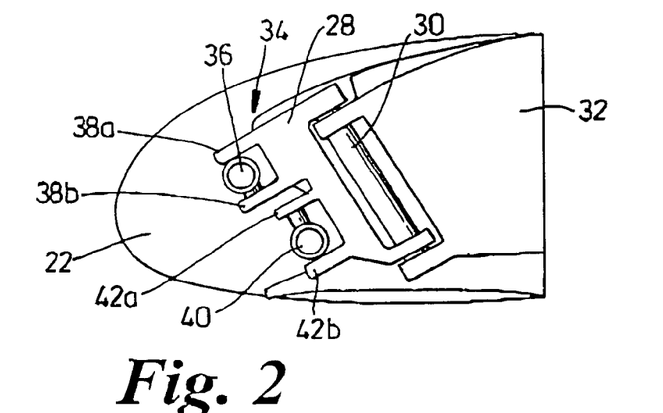
FIG. 2 is a sectional side view of a wing leading edge showing a swing arm assembly in a retracted position.
Figure 3:
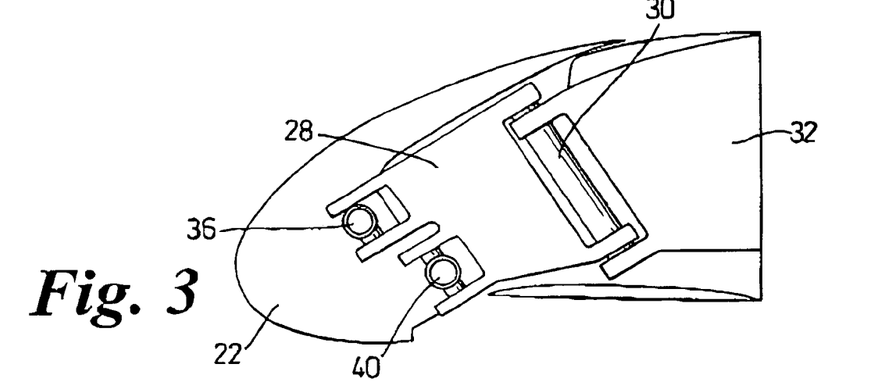
FIG. 3 is a sectional side view showing a swing arm assembly in a semi-deployed position.
Figure 4:
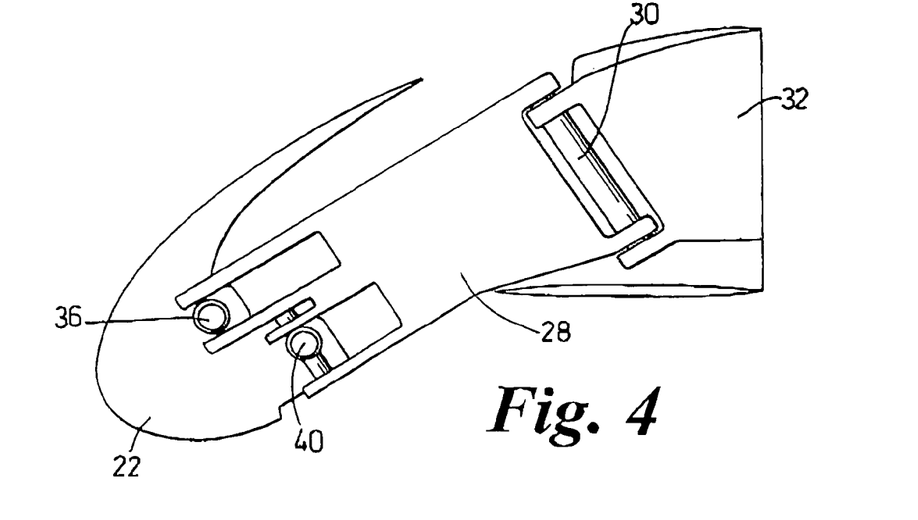
FIG. 4 is a sectional side view showing a swing arm assembly in a fully deployed position.

The first swing arm assembly 24 is shown in more detail in FIGS. 2, 3 and 4. The assembly 24 includes a swing arm 28 that is attached at one end by means of a first pivot joint 30 to a structural member 32 within the leading edge envelope 10 of the main wing section 8. The pivot axis of the first pivot joint 30 is inclined forwards relative to the vertical axis of the main wing section 8 so that as the slat 22 is deployed, it is translated forwards and downwards relative to the leading edge of the wing 10. The swing arm 28 has a longitudinal axis that extends perpendicular to the pivot axis of the first pivot joint 30 and lies in the plane of the swing arm 28.

The swing arm 28 is connected at its other end to the slat 22 by means of a connector mechanism 34. The connector mechanism 34 includes a first joint 36 and a second joint 40. The first joint 36 is a universal joint that provides two rotational degrees of freedom and is mounted between a first pair of fingers 38, comprising upper and lower fingers 38a,38b, that protrude from the swing arm 28. The first joint 36 allows rotation about a first axis that is substantially perpendicular to the longitudinal axis of the swing arm 28 and lies in the plane of the swing arm, and a second axis that is substantially perpendicular to the first axis and parallel to the longitudinal axis of the slat 22.

The connector mechanism 34 also includes a second joint 40, comprising a sliding universal joint that is arranged to allow first and second rotational degrees of freedom about first and second axes of rotation respectively and first and second translational degrees of freedom along the first and second axes of rotation. The first axis of rotation is substantially perpendicular to the longitudinal axis of the swing arm 28 and lies in the plane of the swing arm 28, and the second axis is substantially perpendicular to the first axis and parallel to the longitudinal axis of the slat 22. The first axes of rotation of the first and second joints are substantially parallel to one another and likewise the second axes of rotation are also substantially parallel to one another.

The first axes of rotation of the first joint 36 and the second joint 40 may alternatively be arranged substantially parallel to the axis of the pivot joint 30.

Figure 8:
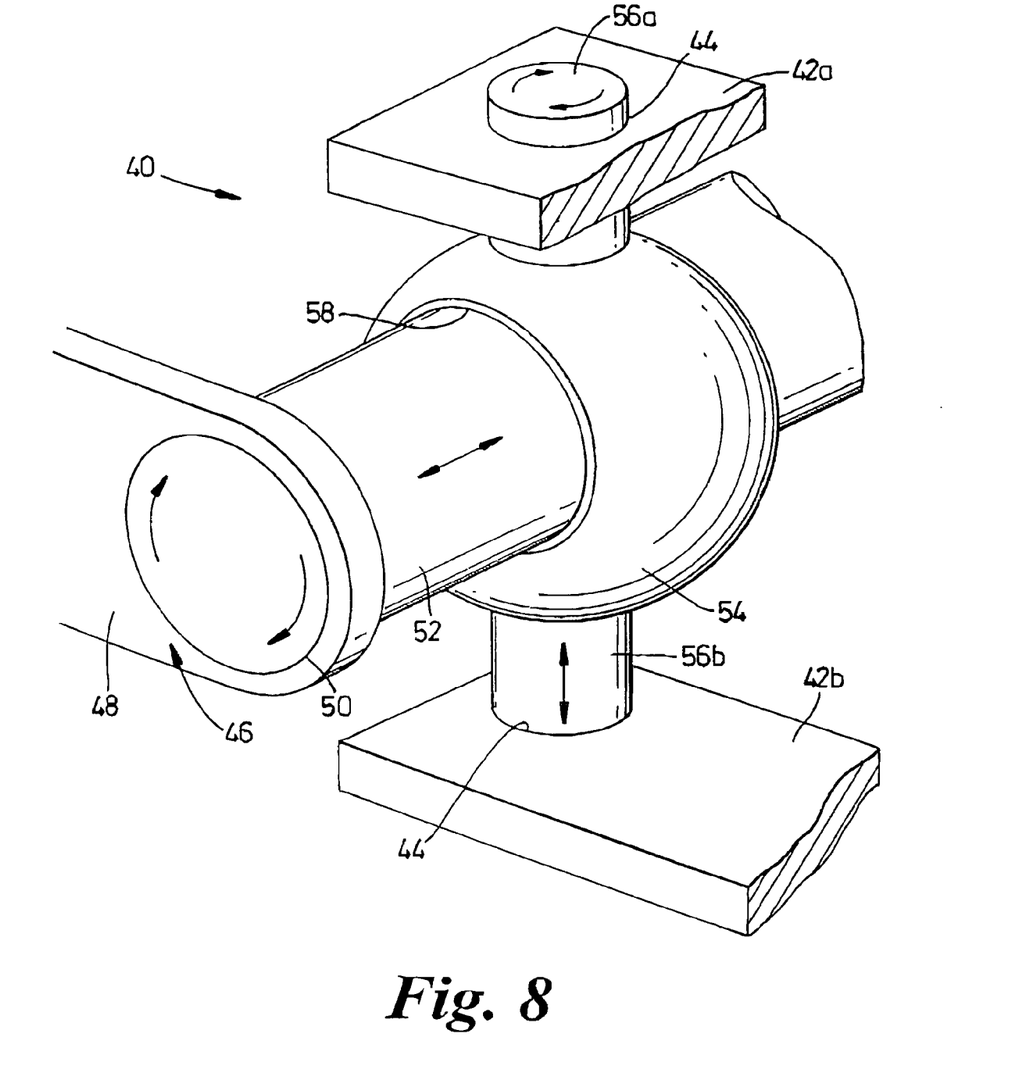
FIG. 8 is a detail view of a sliding joint.

FIG. 8 shows an enlarged view of the second joint 40 and its mounting arrangement. The second joint 40 is mounted on the swing arm 28 between a second pair of fingers 42, comprising upper and lower fingers 42a,42b, located towards one end of the arm 28 below and substantially parallel to the first pair of fingers 38. The upper and lower fingers 42a,42b each have a through hole 44. The second pair of fingers 42 is shorter than the first pair of fingers 38. The difference in length between the first and second pairs of fingers 38,42 means that the effective radius of the swing arm 28, that is the distance between the first pivot point 30 and the first pivot axes of the first and second joints respectively, is greater for the first joint 36 than for the second joint 40. This difference in effective radius of the swing arm 28 for the first and second joints 36,40 causes the slat 22 to rotate as it is deployed.

The slat 22 is attached to the second joint 40 via a mounting 46 that includes two arms 48 each having a through hole 50. The second joint 40 includes a first shaft 52 and a support member 54 having upper and lower shafts 56a,56b attached thereto and a through hole 58. The first shaft 52 extends through the hole 58 in the support member 54, through the holes 50 in the slat mounting arms 48, and is fixed relative to the support member 54. The arrangement allows the support mounting 46 to rotate about and freely slide along the first shaft 52, thus permitting the second rotational and translational degrees of freedom. The sliding movement between the slat mounting 46 and the first shaft 52 allows for limited movement of the slat 22 relative to the swing arm 28 substantially in the axial direction of the slat 22, which serves as a lost motion mechanism between the slat 22 and swing arm 28. The lost motion mechanism compensates for thermal expansion and contraction of the slat 22 during flight, without transferring stresses to the main wing section 8. The lost motion mechanism also compensates for wear in the joints and for manufacturing tolerances in the components of the system. The mechanism prevents the slat 22 from jamming when, for example, the swing arms 24,26 are aligned.

Alternatively, the slat mounting arms 48 can be fixed to the first shaft 52 and the first shaft 52 can be arranged such that it can rotate and move translationally relative to the support member 54 in hole 58. As the slat 22 undergoes thermal expansion the first shaft 52 can provide lost motion between the slat 22 and the swing arm 28 by moving freely translationally relative to the support member 54. This provides an alternative arrangement for providing the second rotational and translational degrees of freedom.

The upper and lower shafts 56a,56b are fixed to the support member 54 and each extends through one of the holes 44 in the upper and lower fingers 42a,42b respectively. The upper and lower shafts 56a,56b are arranged such that they can rotate relative to the upper and lower fingers 42a,42b and can slide through holes 44, permitting the first rotational and translational degrees of freedom.

The second joint 40 described thus has four degrees of freedom. The sliding movement of the upper and lower shafts 56a,56b through the upper and lower fingers 42a,42b allows for limited movement of the slat 22 relative to the swing arm 28 in a direction substantially perpendicular to the swing arm 28.

The interaction between the first and second joints 36,40 controls rotation of the slat 22 through an angle in the range 22 to 32 degrees and preferably approximately 27 degrees, and therefore determines its angle of attack. Since the second axes of rotation of the first and second joints 36,40 are offset, rotation of the slat 22 about the second axes causes translational movement of the support member 54 along the first axis of rotation of the second joint 40.

Figure 9:
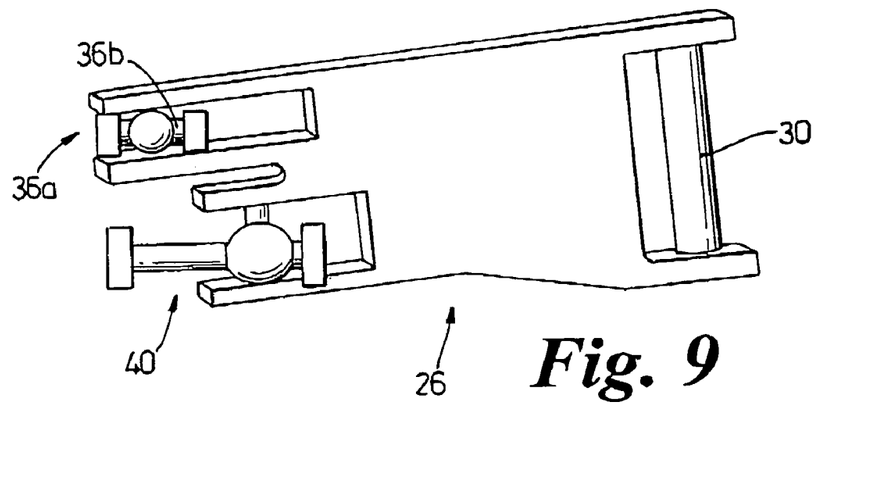
FIG. 9 is a side view of a second swing arm assembly.

The second swing arm assembly 26 is slightly shorter than the first swing arm assembly 24 so that when the slat 22 is deployed, the separation between the slat 22 and the wing leading edge 10 is slightly larger at the inner end of the slat 22 (towards the root of the main wing 16) than it is at the outer end of the slat 22 (towards the tip of the main wing 14). This provides an ideal configuration, wherein the distance between the slat 22 and the wing 8 is proportional to the chord of the wing at that point. When the swing arm assemblies 24,26 are deployed they typically rotate through approximately the same angle which means the translation of the first joints will vary along the length of the wing. To accommodate this arrangement the second swing arm assembly 26 includes a modified first joint 36a that includes a lost motion mechanism (see FIG. 9). That is, the first joint 36a includes first and second rotational degrees of freedom (as the first joint 36 in the first swing arm assembly 24) but also includes a first translational degree of freedom in a direction that is substantially parallel to the longitudinal axis of the slat 22. The first joint 36a includes a shaft 36b, and is connected to the slat 22 via a mounting attached to the shaft 36b. The shaft 36b is arranged for free sliding movement in a direction substantially parallel to the longitudinal axis of the slat 22 and the lost motion mechanism operates similarly to the lost motion mechanism included in the second joint 40. The lost motion mechanism reduces the amount of stress transmitted to the main wing section 8 because of the relative positions of the first joints 36,36a when the first and second arm assemblies 24,26 are deployed. The lost motion mechanism also reduces the amount of stress transmitted to the main wing section 8 due to thermal expansion and contraction of the moveable wing surface.

To achieve the ideal configuration of slat 22 deployment for tapered wings having a plurality of slats 22a,22b,22c, the length of the swing arm assemblies 24,26 used decreases the further away they are located from the root 16 of the wing, i.e. the longest swing arm assembly 24 used is located closest to the root 16 of the wing and the shortest is located towards the tip 14 of the wing.

In other aspects the second swing arm assembly 26 is similar to the first swing arm assembly 24.

The first swing arm assembly 24 also includes a drive mechanism (not shown) for driving the first swing arm assembly 24 for rotation about the first pivot joint 32 from a retracted position to a fully deployed position.

Figure 5:
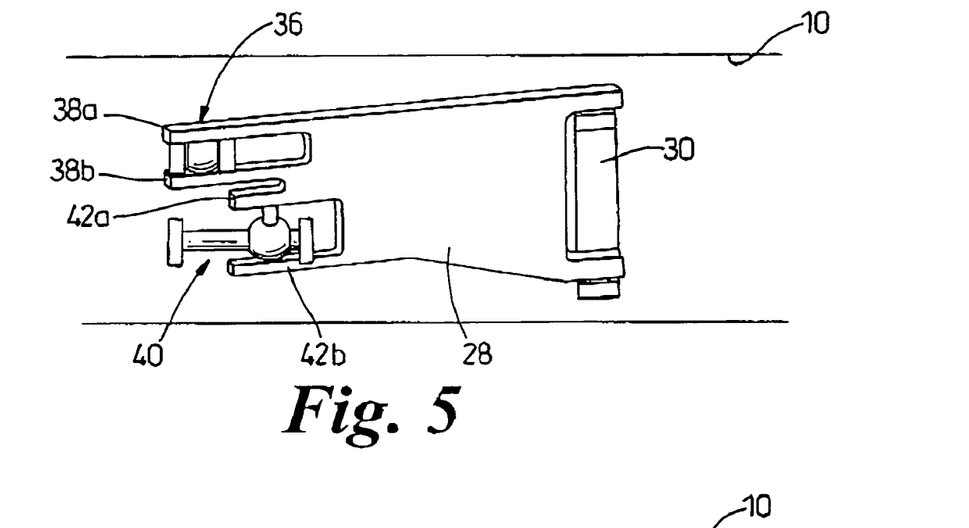
FIG. 5 is a front view of a wing leading edge with a swing arm assembly in a retracted position.
Figure 6:
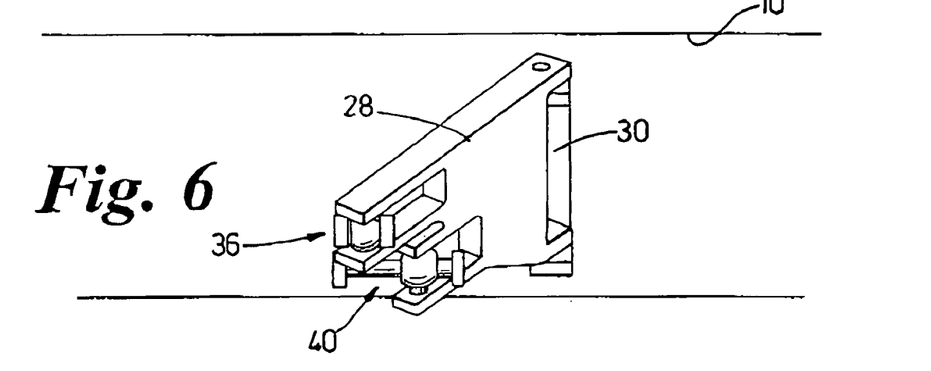
FIG. 6 is a front view of a wing leading edge with a swing arm in a semi-deployed position.
Figure 7:
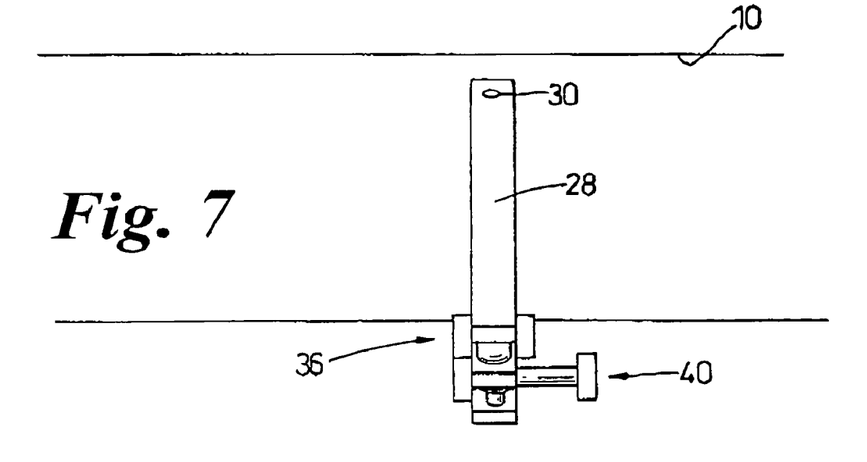
FIG. 7 is a front view of a wing leading edge with a swing arm in a fully deployed position.

To deploy the slat 22, the drive mechanism for the first swing arm assembly 24 is actuated, causing the first swing arm 28 to rotate through an angle of approximately 90 degrees from the retracted position shown in FIGS. 2 and 5 in which it is approximately parallel to the leading edge of the wing 10 to the deployed position shown in FIGS. 4 and 7 in which the arm is approximately perpendicular to the leading edge of the wing 10. The second swing arm assembly 26 is actuated at the same time as the first swing arm assembly 24 by a system of linkages connecting the arm assemblies 24,26 together (see the interconnection system described below).

Operation of the first arm assembly 24 only will now be described for the purposes of clarity. The pivot axis of the first pivot joints 30 of the first arm assembly 24 is inclined forwards so that as the slat 22 is deployed, it is translated forwards and downwards relative to the leading edge of the wing 10. The slat 22 is further caused to rotate about its longitudinal axis by the interaction of the first joint 36 and the second joint 40. When the slat 22 is in the retracted position the support member 54 is located at its minimum height position towards the lower finger 42b. As the slat 22 is deployed the support member 54 moves towards the upper finger 42a reaching its maximum height position when the slat 22 is fully deployed. This movement causes the slat 22 to rotate relative to the main wing section 8 and therefore change its angle of attack. The slat 22 can rotate or tilt about its longitudinal axis between the approximate positions shown in FIGS. 2 and 4. The second arm assembly 26 operates in a complementary way to the first arm assembly 24 to achieve deployment of the slat 22.

Figure 10:
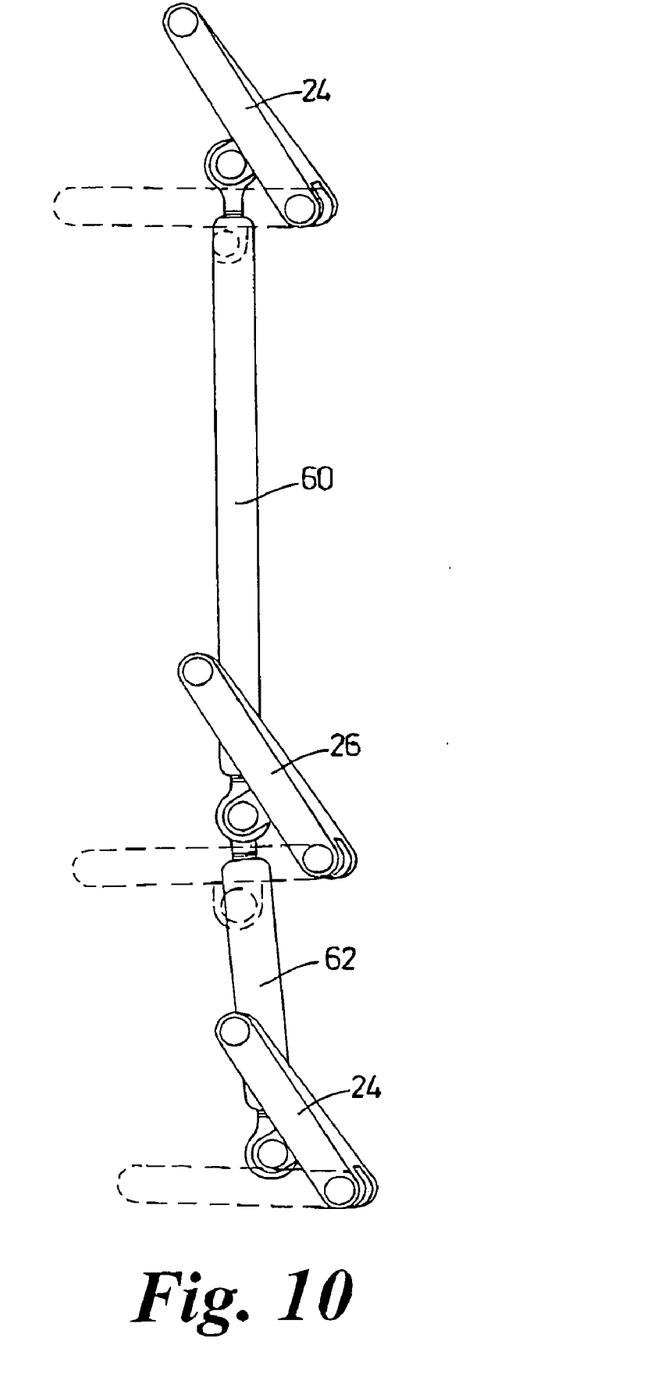
FIG. 10 is a plan view of three swing arms interconnected by actuation struts.

In order to ensure the system deploys symmetrically over both wings an interconnection system is employed. The interconnection system connects the slats 22a,22b,22c such that they all deploy substantially at the same time. One such system is illustrated in FIG. 10. The interconnection system uses a strut 60 pivotally connected to the swing arm assemblies 24,26 of a particular slat 22 (a first slat) to provide a connection between the first swing arm assembly 24 and the second swing arm assembly 26. A second strut 62 is used to connect the second arm assembly 26 of the first slat to the first arm assembly 24 of an adjacent slat. The lost motion mechanism in the first joint 36a of the second swing arm assembly 26 ensures that thermal differences between the slat 22 and the main wing 8 do not contribute to poor setting of the slats 22 nor produce stress in the mechanism. By carefully positioning the pivot joints on the swing arm assemblies 24,26 it is possible to improve the mechanical advantage of the interconnection system, such that lower strut forces are required to deploy and retract the system, thus ensuring minimal system weight. Such an advantageous set-up is shown in FIG. 10 where the strut 60 stays at a maximum distance from the axis of rotation at all times, thus ensuring maximum available torque for minimal force.

Another interconnection system (not shown) connects the second swing arm assembly 26 for a first slat to the first swing arm assembly 24 of a second slat 22, for example the inner slat 22a to the middle slat 22b. No strut is used to connect the arm assemblies for a particular slat since connection between the arm assemblies is provided by the slat structure itself.

The second joint 40 is not limited to the particular arrangements described above but can adopt any suitable arrangement that provides the desired degrees of freedom. For example, in a second embodiment of the invention the second joints 40 in the first and second arm assemblies 24,26 are replaced by conventional sliding spherical joints 140 that attach the slat to the swing arms (see FIG. 11). In other respects, the second embodiment is similar to the first embodiment.

Figure 11:
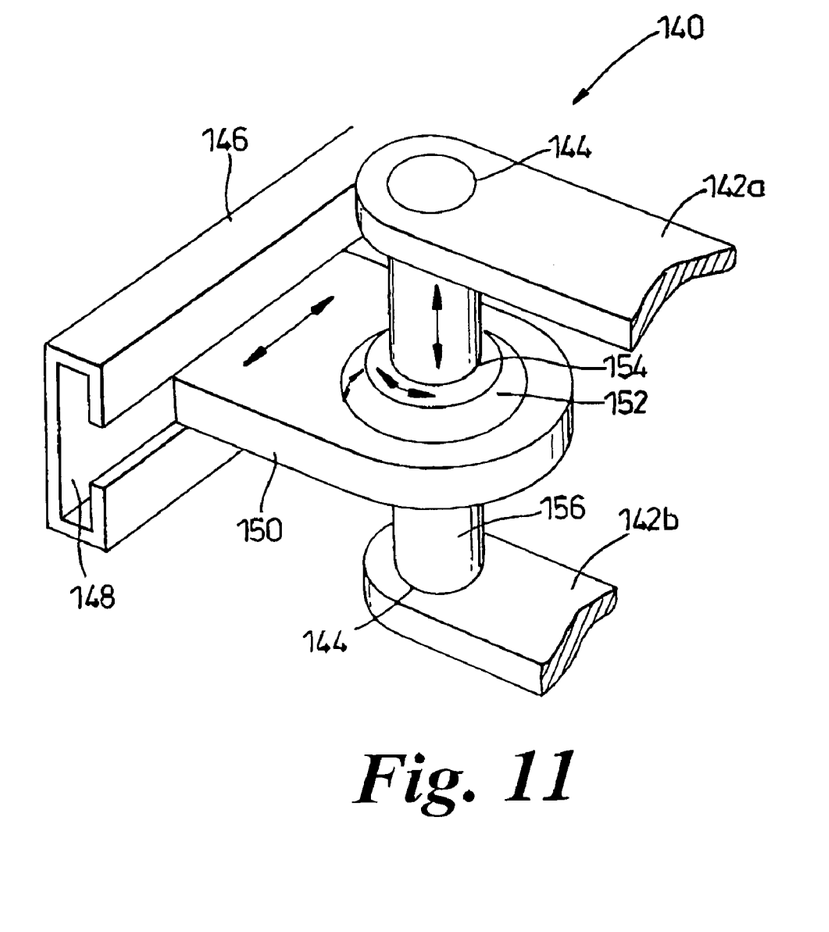
FIG. 11 is a detail view of a second sliding joint.

The sliding spherical joint 140 has first and second rotational degrees of freedom and first and second translational degrees of freedom. It is mounted on the swing arm between a pair of fingers 142, comprising upper and lower fingers 142a,142b. The upper and lower fingers 142a,142b each have a through hole 144. The sliding spherical joint 140 includes a bracket 146 having a T-shaped slot 148 that defines a bearing surface, and a bearing member 150. The bracket 146 is attached to the slat. The bearing member 150 includes a part that is complementary to the T-shaped slot 148. The complementary part is located within the slot 148 and can slide freely along it, and defines the second translational degree of freedom. The free sliding movement of the bearing member 150 in the slot 148 acts as a lost motion mechanism allowing relative movement between the slat and the main wing section in a direction substantially parallel to the longitudinal axis of the slat to compensate for thermal expansion and contraction of the slat during flight, without transferring stresses to the main wing section 8.

The bearing member 150 houses a spherical member 152. The spherical member 152 has a through hole 154. A shaft 156 is located within the hole 154 and is arranged to extend through holes 144 in the fingers 142a, 142b. The spherical member 152 can move rotationally relative to the bearing member 150 but not translationally. The spherical member 152 allows the bearing member 150 to rotate about the shaft 156 and to tilt relative to the shaft 156. The spherical member 152 can also slide along the shaft 156. The relative movement between the shaft 146 and the bearing member 150 permits the first and second rotational degrees of freedom and the first translational degree of freedom in the sliding spherical joint 140.

Similarly to the first embodiment of the invention, deployment of the slat is controlled by the interaction of the first joint 36, and the sliding spherical joint 140. The arrangement of the second embodiment provides a light, stiff and relatively simple mechanical joint.

The swing arm system may be used for deploying slats or flaps and in the above description references to slat deployment systems are intended to include flap deployment systems, and vice versa.

What is claimed is:

1. A swing arm assembly for displacing an associated moveable wing surface relative to an associated wing section, the associated moveable wing surface having a longitudinal axis, said swing arm assembly comprising:

a swing arm member having a first mounting portion supported on the associate wing section, and second and third mounting portions supporting the associated moveable wing surface;

a first connector arrangement extending between said first mounting portion and the associate wing section, said first connector arrangement having at least a first rotational degree of freedom;

a second connector arrangement extending between said second mounting portion and the associated moveable wing surface, said second connector arrangement having at least first and second rotational degrees of freedom; and, a third connector arrangement extending between said third mounting portion and the associated moveable wing surface, said third connector arrangement having at least first and second rotational degrees of freedom and at least a first translational degree of freedom.

2. A swing arm assembly according to claim 1, wherein said second mounting portion is spaced a first distance from said first mounting portion and said third mounting portion is spaced a second distance from said first mounting portion.

3. A swing arm assembly according to claim 2, wherein said first distance is greater than said second distance.

4. A swing arm assembly according to claim 1, wherein at least one of said first, second and third mounting portions includes first and second spaced-apart tabs.

5. A swing arm assembly according to claim 4, wherein at least one of said first, second and third connector arrangements includes a pivot member having an axis and supported between said first and second spaced-apart tabs of said at least one of said first, second and third mounting portions.

6. A swing arm assembly according to claim 5, wherein at least one of said first, second and third connector arrangements includes a connecting member supported on said pivot member.

7. A swing arm assembly according to claim 6, wherein said connecting member is displaceable along said axis between said first and second spaced-apart tabs.

8. A swing arm assembly according to claim 7, wherein said displacement of said connecting member is due to one of sliding movement of said connecting member along said pivot member and sliding movement of said pivot member relative to said first and second spaced-apart tabs.

9. A swing arm assembly according to claim 1, wherein said second and third connector arrangements each include a first pivot member, a connecting member supported on said first pivot member, and a second pivot member respectively extending from said connecting member substantially perpendicular to said first pivot member.

10. A swing arm assembly according to claim 9, wherein said second pivot member of at least one of said second and third connector arrangements is adapted for lost motion movement.

11. A swing arm assembly according to claim 1, wherein said swing arm member has a longitudinally extending centerline and said first translational degree of freedom of said third connector arrangement is in a direction substantially perpendicular to said centerline.

12. A swing arm assembly according to claim 1, wherein said third connector arrangement has a second translational degree of freedom.

13. A swing arm assembly according to claim 12, wherein said second translational degree of freedom of said third connector arrangement is in a direction substantially parallel to a longitudinal axis of the associated moveable wing surface.

14. A swing arm assembly according to claim 13, wherein said third connector arrangement is adapted to provide lost motion movement in alignment with said second translational degree of freedom.

15. A swing arm assembly according to claim 1, wherein said first rotational degree of freedom of at least one of said first, second and third connector arrangements is about a pivot axis extending substantially perpendicular to said centerline axis of said swing arm member.

16. A swing arm assembly according to claim 1, wherein said second rotational degree of freedom of at least one of said second and third connector arrangements is about an axis that is in substantial alignment with a longitudinal axis of the associated moveable wing surface.

17. A deployment system adapted to deploy and retract an associated moveable wing surface respectively to and from an associated wing section, said deployment system comprising:

a plurality of swing arm assemblies interconnected between the associated moveable wing surface and the associated wing section, at least one of said plurality of swing arm assemblies including a swing arm and a connector mechanism, said swing arm having a longitudinal axis and being pivotably connected to the associated wing section, said connector mechanism interconnecting the associated moveable wing surface and said swing arm; and, a drive system engaging at least one of said plurality of swing arm assemblies and operable to displace at least one of said plurality of swing arm assemblies to deploy and retract the associated moveable wing surface;

said connector mechanism including a first joint and a second joint, said first joint having at least first and second rotational degrees of freedom, said second joint having at least first and second rotation degrees of freedom and at least first and second translational degrees of freedom.

18. A deployment system according to claim 17, wherein said first swing arm assembly has a first length and said second swing arm assembly has a second length.

19. A deployment system according to claim 18, wherein said first length is greater than said second length.

20. A deployment system according to claim 17, wherein said drive system includes a linkage interconnecting at least two of said plurality of swing arm assemblies.

* * * * *